(12) United States Patent
Brennan et al.

(10) Patent No.: US 11,702,356 B2
(45) Date of Patent: Jul. 18, 2023

(54) ASSEMBLIES AND METHODS FOR BENDING GLASS

(71) Applicant: CORNING INCORPORATED, Corning, NY (US)

(72) Inventors: Michael Timothy Brennan, Painted Post, NY (US); Philippe Dardart, Beaumont du Gatinais (FR); Anurag Jain, Painted Post, NY (US); Nikolaos Pantelis Kladias, Horseheads, NY (US); Eric Lee Miller, Corning, NY (US); Stephane Poissy, Brunoy (FR); Larry Gene Smith, Tulsa, OK (US); Chad Michael Wilcox, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 423 days.

(21) Appl. No.: 16/849,268

(22) Filed: Apr. 15, 2020

(65) Prior Publication Data

US 2020/0325059 A1    Oct. 15, 2020

Related U.S. Application Data

(60) Provisional application No. 62/834,029, filed on Apr. 15, 2019.

(51) Int. Cl.
*C03B 23/03* (2006.01)

(52) U.S. Cl.
CPC ................ *C03B 23/0307* (2013.01)

(58) Field of Classification Search
USPC ........................................... 65/288
See application file for complete search history.

(56) References Cited

U.S. PATENT DOCUMENTS

| | | | | |
|---|---|---|---|---|
| 3,348,935 A | * | 10/1967 | Carson | C03B 23/027 65/288 |
| 3,899,316 A | * | 8/1975 | Ehlers | C03B 40/005 65/273 |
| 4,396,410 A | * | 8/1983 | Hagedorn | C03B 23/03 65/273 |
| 4,687,501 A | * | 8/1987 | Reese | C03B 23/027 65/288 |
| 5,176,733 A | * | 1/1993 | Koss | C03B 23/0258 65/273 |
| 5,656,052 A | * | 8/1997 | Boardman | C03B 23/0258 65/117 |
| 5,849,056 A | * | 12/1998 | May | C03B 23/0305 65/273 |

(Continued)

FOREIGN PATENT DOCUMENTS

| | | | | |
|---|---|---|---|---|
| WO | WO-2017019851 A1 | * | 2/2017 | ........... C03B 27/012 |
| WO | WO-2017020040 A2 | * | 2/2017 | ........... C03B 27/012 |
| WO | WO-2020032812 A1 | * | 2/2020 | ............. C03B 23/03 |

*Primary Examiner* — Jodi C Franklin (57) ABSTRACT

Various embodiments disclosed relate to a method for bending a glass substrate. The method includes actuating at least one heat shield to a first position at least partially covering an edge portion of a first major surface of the glass substrate. The method further includes heating the glass substrate. The method further includes actuating the at least one heat shield to a second position at least partially uncovering the edge portion of the glass substrate.

11 Claims, 4 Drawing Sheets

(56) References Cited

U.S. PATENT DOCUMENTS

| | | | | |
|---|---|---|---|---|
| 5,849,057 | A * | 12/1998 | Didelot | C03B 23/0305 |
| | | | | 65/106 |
| 8,156,764 | B2 * | 4/2012 | Machura | C03B 23/027 |
| | | | | 65/273 |
| 9,556,054 | B2 * | 1/2017 | Dannoux | B29C 53/22 |
| 10,259,294 | B2 * | 4/2019 | Yamakawa | B32B 17/10036 |
| 2013/0125592 | A1 * | 5/2013 | Bisson | C03B 23/0258 |
| | | | | 65/273 |
| 2016/0145141 | A1 * | 5/2016 | Bennett | C03B 27/044 |
| | | | | 65/103 |
| 2017/0081237 | A1 * | 3/2017 | Costello, III | C03B 23/0235 |
| 2017/0240453 | A1 * | 8/2017 | Kladias | C03B 29/025 |
| 2017/0369355 | A1 * | 12/2017 | Angel | C03B 40/005 |
| 2018/0194663 | A1 * | 7/2018 | Mannheim Astete | |
| | | | | C03B 23/0305 |
| 2018/0362386 | A1 * | 12/2018 | Betschart | C03B 23/0355 |
| 2019/0315647 | A1 * | 10/2019 | Yu | C03B 23/027 |
| 2020/0156985 | A1 * | 5/2020 | Smith | C03B 23/0355 |
| 2020/0325058 | A1 * | 10/2020 | Burdette | C03B 23/0252 |
| 2020/0325059 | A1 * | 10/2020 | Brennan | C03B 23/0307 |
| 2021/0188686 | A1 * | 6/2021 | Olivier | C03B 23/03 |
| 2021/0276911 | A1 * | 9/2021 | Ota | C03B 23/03 |
| 2021/0317029 | A1 * | 10/2021 | Myl | C03B 29/00 |

* cited by examiner

FIG. 4

ASSEMBLIES AND METHODS FOR BENDING GLASS

CROSS-REFERENCE TO RELATED APPLICATIONS

This application claims the benefit of priority under 35 U.S.C. § 119 of U.S. Provisional Application Ser. No. 62/834,029 filed on Apr. 15, 2019 the content of which is relied upon and incorporated herein by reference in its entirety.

BACKGROUND

Glass parts used in a vehicle as a windshield, window, or the like often need to be curved to a specific degree before being included in the vehicle. Curving or bending the glass assembly can include exposing the glass part to an amount of heat that will cause the glass part to bend. If the heat applied to the glass part is not controlled, defects may be imparted to the glass part. One defect that can be imparted to the glass part is a "bathtub" effect in which the edge region of the glass part is over-sagged compared to the target shape and the center of the part is flat and under-sagged, resulting in a bathtub like shape. This bathtub effect can be especially pronounced in thin glass parts (e.g., having a thickness less than or equal to about 1.0 mm) as compared to thicker glass parts (e.g., having a thickness in a range of from about 3.2 mm to about 5 mm).

SUMMARY OF THE DISCLOSURE

The present disclosure provides a method for bending a glass substrate. The method includes actuating at least one heat shield to a first position at least partially covering an edge portion of a first major surface of the glass substrate. The method further includes heating the glass substrate. The method further includes actuating the at least one heat shield to a second position at least partially uncovering the edge portion of the glass substrate.

The present disclosure provides a method of bending a glass substrate. The method includes contacting a glass substrate with a bending ring. The method further includes actuating a first heat shield, a second heat shield, a third heat shield, and a fourth heat shield to a first position at least partially covering an edge portion of a first major surface of the glass substrate. The method further includes heating the glass substrate. The method further includes actuating the at least one heat shield to a second position at least partially uncovering the edge portion of the glass substrate. The method further includes engaging the glass substrate with a press mold. The method further includes cooling the glass substrate.

The present disclosure provides a glass laminate structure including a first curved glass substrate, a second curved glass substrate and an interlayer disposed between the first curved glass substrate and the second curved glass substrate. The first and second glass substrates are formed by a method for bending a glass substrate. The method includes actuating a heat shield to a first position at least partially covering an edge portion of a first major surface of the glass substrate. The method further includes heating the glass substrate. The method further includes actuating the at least one heat shield to a second position at least partially uncovering the edge portion of the glass substrate.

The present disclosure further provides an assembly for bending a glass substrate. The assembly includes a support extending along an x-direction and a y-direction. The support includes a support first major surface and an opposed second major surface. The assembly further includes a bending ring attached to and extending vertically along a z-direction from the support first major surface substantially along an outer perimeter of the support first major surface. The assembly further includes at least one actuatable heat shield attached to the support.

The present disclosure further includes a vehicle. The vehicle includes a body defining an interior and an opening in communication with the interior. The vehicle further includes a glass laminate structure disposed in the opening, with the glass laminate structure including a first curved glass substrate, a second curved glass substrate, and an interlayer disposed between the first curved glass substrate and the second curved glass substrate. The first and second glass substrates are formed by a method for bending a glass substrate. The method includes actuating at least one heat shield to a first position at least partially covering an edge portion of a first major surface of the glass substrate. The method further includes heating the glass substrate. The method further includes actuating the at least one heat shield to a second position at least partially uncovering the edge portion of the glass substrate.

BRIEF DESCRIPTION OF THE FIGURES

The drawings illustrate generally, by way of example, but not by way of limitation, various embodiments discussed in the present document.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

Various embodiments of the present disclosure are directed towards assemblies for bending a glass substrate. The assemblies described herein are capable of selectively creating a temperature difference across multiple sections or regions of the glass substrate such that the sections or regions can be bent to a desired degree to result in the glass substrate conforming to a desired shape.

Figure 1:
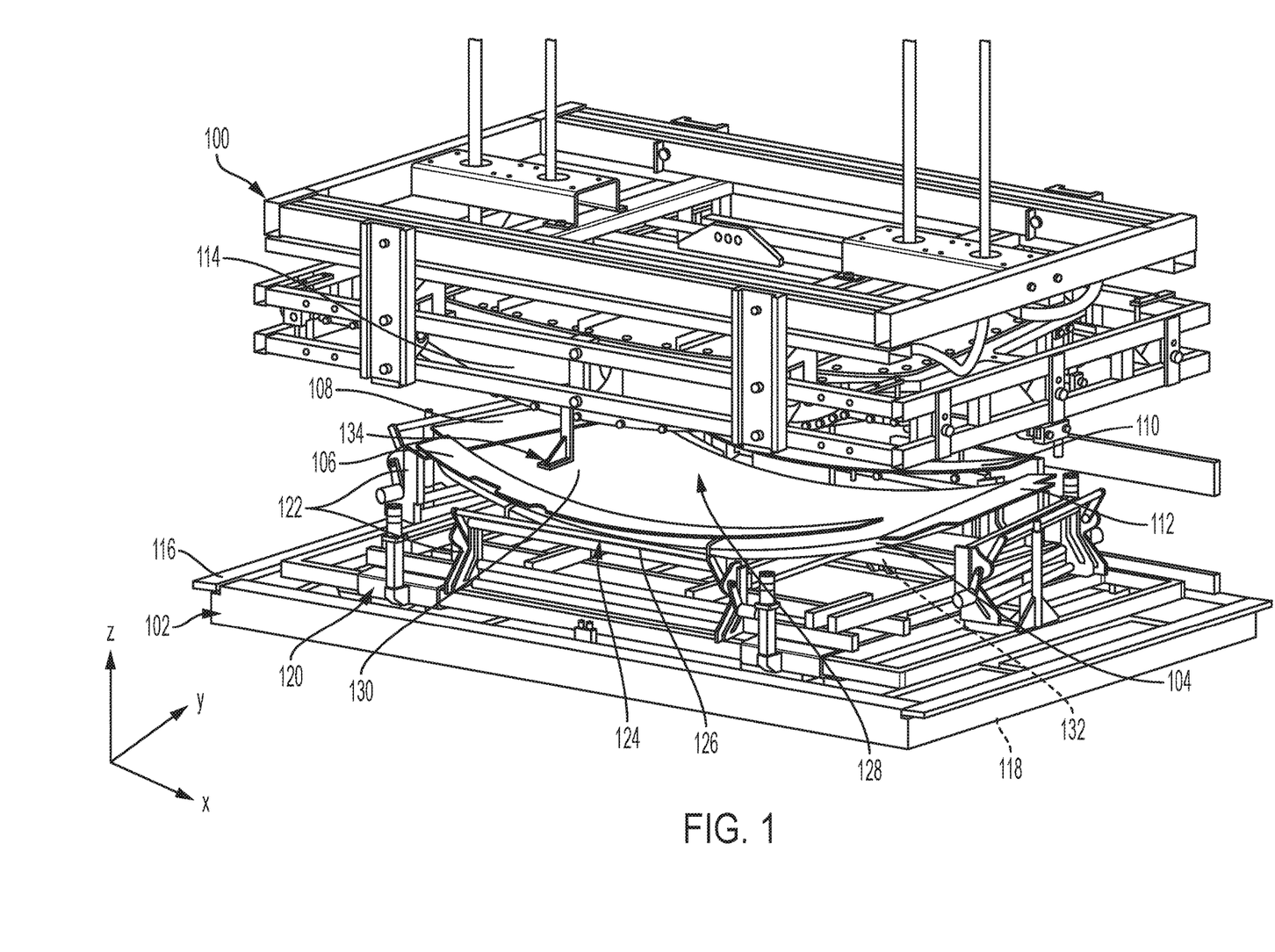
FIG. 1 is a perspective view of an assembly for bending a glass substrate, in accordance with various embodiments.

FIG. 1 is a perspective view of an assembly for bending a glass substrate. As shown in FIG. 1, assembly 100 includes support structure 102, bending ring 104, first heat shield 106, second heat shield 108, third heat shield 110, fourth heat shield 112, and press mold 114. Although four heat shields are shown, in further embodiments assembly 100 can include as few as one heat shield or any plural number of heat shields. Support structure 102 extends generally in the x-y direction as shown in FIG. 1. Support structure 102 also includes first major surface 116 and opposed second major surface 118 with a thickness therebetween defined in the z-direction. Support structure 102 can be a wagon, frame, or any support structure that can be used to attach components to. Support structure 102 can be configured to be a stationary structure. Alternatively, support structure 102 can be configured to be a mobile structure. For example, support structure 102 can have wheels or skids attached to a bottom surface. This can be helpful in applications where assembly 100 needs to be moved from one location to another, such as between zones in a furnace.

Bending ring 104 is attached to support first major surface 116 and extends vertically in the z-direction therefrom. Bending ring 104 can have a major diameter, measured in either the x-direction or the y-direction. In various embodiments, the profile of the bending ring 104 is substantially commensurate with the profile of first major surface 116. According to various embodiments, bending ring 104 can have a substantially circular or rectangular profile. As shown in FIG. 1, bending ring 104 is curved in the z-direction; however, in further embodiments, bending ring 104 can have a linear profile.

First heat shield 106, second heat shield 108, third heat shield 110, and fourth heat shield 112 are attached to support first major surface 116. As shown in FIG. 1, heat shields 106, 108, 110, and 112 are attached to support first major surface 116 by actuator assembly 120.

Actuator assembly 120 includes hinges 122. Hinges 122 include a stationary member and hinged member 124, which is attached to a respective heat shield 106, 108, 110, and 112. Hinged member 124 includes landing portion 126. Landing portion 126 is adapted to engage with actuator engagement member 134 of press mold 114 to actuate heat shields 106, 108, 110, and 112 at least between a first position (shown in FIG. 1) and a second position.

Heat shields 106, 108, 110, and 112 can independently include a thermally absorbent material, a thermally reflective material, or a combination thereof. The thermally absorbent material or thermally reflective material can be chosen from a metal, a fiber, a ceramic, or a mixture thereof. Suitable examples of metals include a stainless steel, a nickel alloy or a combination thereof. Suitable examples of stainless steel grades can include SS 304, SS 309, SS 316, SS 347, and SS 405. Suitable examples of nickel alloys include Inconel alloys such as Inconel 600, Inconel 617, Inconel 625, Inconel 690, Inconel 718, and Inconel X-750. Further examples of suitable metals include alloys of a refractory metal such as a molybdenum alloy, tungsten alloy, niobium alloy, tantalum alloy, rhenium alloy, or a combination thereof.

Suitable examples of fibers can include glass fiber, aramid fibers, carbon fibers, poly-phenylene benzo-bisoxazole fibers, polybenzimidazole fibers, melamine fibers, or a combination thereof. Where present, the fibers can be woven or non-woven with respect to each other to form a blanket or sheet.

Suitable examples of ceramic materials include an aluminosilicate, an alumina, a silica, a silicon carbide, a silicon nitride, a carbon, a glass, a metal, an alumina-phosphorous pentoxide, an alumina-boria-silica, a zirconia, a zirconia-alumina, a zirconia-silica, a sol gel, $Al_2O_3$, or mixtures thereof. Where present, the ceramic material can be in the form of a blanket, sheet, or board. In some embodiments, any of heat shields 106, 108, 110, or 112 can be at least partially coated with a thermally reflective substance such as a lustrous elemental metal (e.g., gold or chromium), a metal oxide, or thermally reflective paint. According to various embodiments, the ceramic material can be present as a blanket or sheet that is at least partially disposed over a portion of any one of heat shields 106, 108, 110, or 112. In other embodiments, any of shields 106, 108, 110, or 112 are entirely formed from a ceramic.

As shown in FIG. 1, each of heat shields 106, 108, 110, and 112 are shown as continuous structures having a uniform thickness. However, in some embodiments, any of heat shields 106, 108, 110, or 112 can include one or more perforations extending at least partially therethrough. Adding the one or more perforations can be helpful to selectively allow heat to pass through shields 106, 108, 110, or 112. The degree to which heat can pass through an individual perforation can be the result of the size of the individual perforation (e.g., a major width or a major diameter). The size of the one or more perforations can individually be in a range of from about 2 mm to about 10 mm, about 4 mm to about 6 mm, less than, equal to, or greater than about 2 mm, 2.5, 3, 3.5, 4, 4.5, 5, 5.5, 6, 6.5, 7, 7.5, 8, 8.5, 9, 9.5, or about 10 mm. Moreover, the one or more perforations can individually account for about 5 vol % to about 95 vol % of the heat shield, about 10 vol % to about 70 vol %, about 40 vol % to about 60 vol %, less than, equal to, or greater than about 5 vol %, 10, 15, 20, 25, 30, 35, 40, 45, 50, 55, 60, 65, 70, 75, 80, 85, 90, or about 95 vol %. A cross sectional geometry of any one of the perforations can substantially conform to a circular shape or polygonal shape. Examples of suitable circular shapes can include an elongated or non-elongated circle. Examples of suitable polygonal shapes include a triangular shape, a quadrilateral shape, a pentagonal shape, a hexagonal shape, or any higher order polygonal shape.

Additionally, according to various embodiments, any of heat shields 106, 108, 110, or 112 can have a variable thickness. For example, at locations on shields 106, 108, 110, or 112 where it is desired for more heat to pass through, that location on any of shields 106, 108, 110, or 112 may be thinner than another location on the respective shield.

Although four heat shields 106, 108, 110, and 112 are shown in FIG. 1, it is possible to have any plural number of additional heat shields included in assembly 100. For example, assembly 100 can include a fifth heat shield, sixth heat shield, seventh heat shield, and an eighth heat shield. The additional heat shields may be located above bending ring 104 in the z-direction similar to shields 106, 108, 110, and 112. Alternatively, the additional heat shields may be located beneath bending ring 104 in the z-direction. Each heat shield in assembly 100 can include the same materials or mixture of materials. In other embodiments, however, any two or more heat shields can include a different material or mixture of materials.

Assembly 100 can further include an active heater element. The active heater element can be a heat coil, a flame, or an infrared heater. In some embodiments, the active heater element is positioned above bending ring 104 in the z-direction. The active heater element can be stationary and support structure 102 and can be positioned in such a manner that it is aligned with the active heater element. In some embodiments, the active heater element can be positioned such that it is in thermal communication with bending ring 104.

Assembly 100 can further include press mold 114. Press mold 114 includes a curved portion that is adapted to contact and bend a glass substrate. Press mold 114 can be powered by a hydraulic mechanism, by gravity, electronically, or manually. In some embodiments, press mold 114 can include heating or cooling mechanisms that can, in turn, heat or cool a glass substrate to which it is positioned proximately or in contact with. In further embodiments, heating or cooling mechanisms can be used to maintain the thermal conditions in the glass substrate (e.g., to maintain a desired temperature).

Assembly 100 can be used to bend a glass substrate. As shown in FIG. 1, glass substrate 128 is positioned in assembly 100 such that glass substrate 128 is in contact with bending ring 104 and beneath heat shields 106, 108, 110, and 112 in the z-direction. Glass substrate 128 includes first major surface 130 and opposed second major surface 132. Each of first major surface 130 and second major surface 132 include respective first and second edge portions. The first and second edge portions are located along an outer perimeter of the respective first and second major surfaces 130 and 132. The first and second edge portions extend from the outer perimeter towards the center of glass substrate 128.

The first and second edge portions can account for any suitable percentage of the total surface area of first major surfaces 130 and 132, respectively. For example, the first and second edge portions can range from about 1 percent surface area to about 40 percent surface area of first major surface 130 and second major surface 132; respectively about 5 percent surface area to about 20 percent surface area; less than, equal to, or greater than about 5 percent surface area, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or about 40 percent surface area.

Glass substrate 128 can include any suitable material glass such as soda lime silicate glass, alkali aluminosilicate glass, alkali containing borosilicate glass, alkali aluminophosphosilicate glass, alkali aluminoborosilicate glass, or a mixture thereof. In some embodiments, the soda lime silicate glass is substantially free of iron, iron oxide, or mixtures thereof. The glass substrate can have any suitable thickness. For example, a thickness of the glass substrate can be in a range of from about 0.5 mm to about 5 mm, about 1 mm to about 2 mm, less than, equal to, or greater than about 0.5 mm, 1, 1.5, 2, 2.5, 3, 3.5, 4, 4.5, or about 5 mm.

According to various embodiments of the present disclosure, glass substrate 128 can be unstrengthened, annealed, or strengthened. Where the glass substrate 128 is a strengthened glass substrate, the strengthened glass substrate may be strengthened to include a compressive stress that extends from a surface to a depth of compression or depth of compressive stress layer (DOL). The compressive stress at the surface is referred to as the surface CS. The CS regions are balanced by a central portion exhibiting a tensile stress. At the DOL, the stress crosses from a compressive stress to a tensile stress. The compressive stress and the tensile stress are provided herein as absolute values.

In one or more embodiments, the strengthened glass substrate may be strengthened in two or more steps to achieve a first partially strength level (i.e., strengthened to a degree that is a portion of the final strength level in terms of surface CS and DOL) and a final strength level. In one or more embodiments, the strengthening process used to strengthen the strengthened glass substrate may include any one or combinations of a thermal strengthening process, a chemical strengthening process and a mechanical strengthening process.

In one or more embodiments, the strengthened glass substrate may be mechanically strengthened by utilizing a mismatch of the coefficient of thermal expansion between portions of the article to create a compressive stress region and a central region exhibiting a tensile stress. In some embodiments, the strengthened glass substrate may be thermally strengthened by heating the glass to a temperature above the glass transition point and then rapidly quenching.

In various embodiments of the present disclosure, the strengthened glass substrate may be chemically strengthened by ion exchange. In the ion exchange process, ions at or near the surface of the glass substrate are replaced by—or exchanged with—larger ions having the same valence or oxidation state. In embodiments in which the strengthened glass substrate comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $A^+$ or the like. In such embodiments, the monovalent ions (or cations) exchanged into the glass substrate generate a stress. It should be understood that any alkali metal oxide containing inner glass ply can be chemically strengthened by an ion exchange process.

In operation, assembly 100 can be used to bend glass substrate 128. The method of bending glass substrate 128 can include placing glass substrate 128 in contact with bending ring 104. Heat shields 106, 108, 110, and 112 can then be actuated to a first position in which at least a portion of the first edge region of glass substrate 128 is covered. Glass substrate 128 is then heated to a temperature sufficient to cause glass substrate 128 to sag and bend. Once glass substrate 128 is bent to a suitable degree, heat shields 106, 108, 110, and 112 can be actuated to a second position in which a first edge region is uncovered.

Figure 2A:
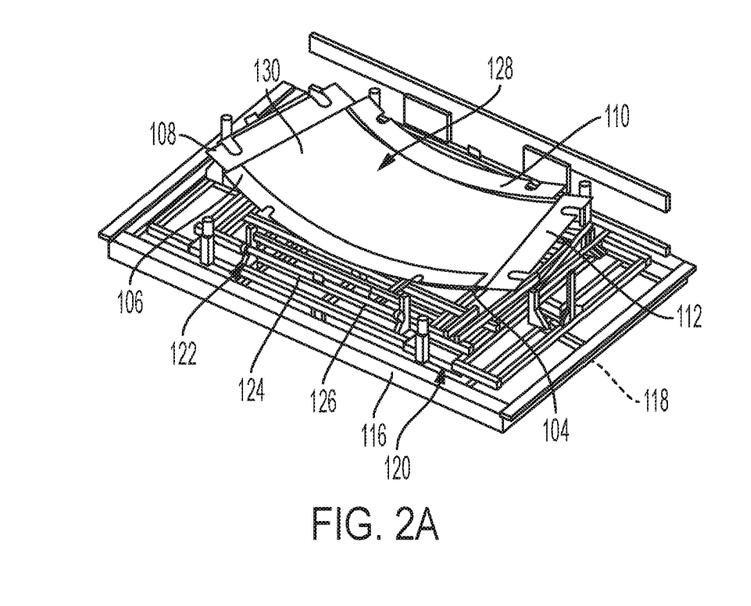
FIG. 2A is a perspective view of an assembly for bending a glass substrate having heat shields disposed in a first position, in accordance with various embodiments.

FIGS. 2A-2B and 3A-3C show examples of assembly 100 where heat shields 106, 108, 110, and 112 are actuated between the first and second positions. As shown in FIG. 2A, glass substrate 128 is placed in contact with bending ring 104 and a first edge region is covered by heat shields 106, 108, 110, and 112. After the first edge region is covered, glass substrate 128 is heated. As an example, glass substrate 128 can be heated to a temperature in a range of from about 600° C. to about 800° C., about 700° C. to about 750° C., less than, equal to, or greater than about 600, 605, 610, 615, 620, 625, 630, 635, 640, 645, 650, 655, 660, 665, 670, 675, 680, 685, 690, 695, 700, 705, 710, 715, 720, 725, 730, 735, 740, 745, 750, 755, 760, 765, 770, 775, 780, 785, 790, 795, or about 800° C. As a result of being covered by heat shields 106, 108, 110, and 112, however, the first edge portion is heated to a lower temperature than the portion or portions of glass substrate 128 (e.g., the center portion) that are not covered by heat shields 106, 108, 110, and 112. For example, the first edge portion can heated to a temperature that is in a range of from about 5° C. to about 100° C. lower than a center portion of the glass substrate, when heat shields 106, 108, 110, and 112 are in the first position, about 30° C. to about 60° C., less than, equal to, or greater than about 5° C., 10, 15, 20, 25, 30, 35, 40, 45, 50, 55, 60, 65, 70, 75, 80, 85, 90, 95, or about 100° C.

Creating a temperature difference between regions in glass substrate 128 can help to mitigate what is known as a "bathtub" effect in glass substrate 128 during bending. The bathtub effect occurs where the first edge region is over-sagged or bent compared to the center region of glass substrate 128. The bathtub effect can be a particular problem for thinner glass, such as glass substrate 128. However, creating the temperature difference with heat shields 106, 108, 110, and 112 results in the first edge region being comparatively cooler than the uncovered regions. Therefore, the first edge region is less likely to over sag or bend and a more reliably shaped glass substrate 128 can be formed. This is because heat shields 106, 108, 110, and 112, block radiation heat transfer to the first edge region of glass substrate 128, whereas the aperture formed by shields 106, 108, 110, and 112, at the center allows radiation heat transfer to the center of glass substrate 128, thus achieving a thermal gradient on the glass substrate 128.

Figure 2B:
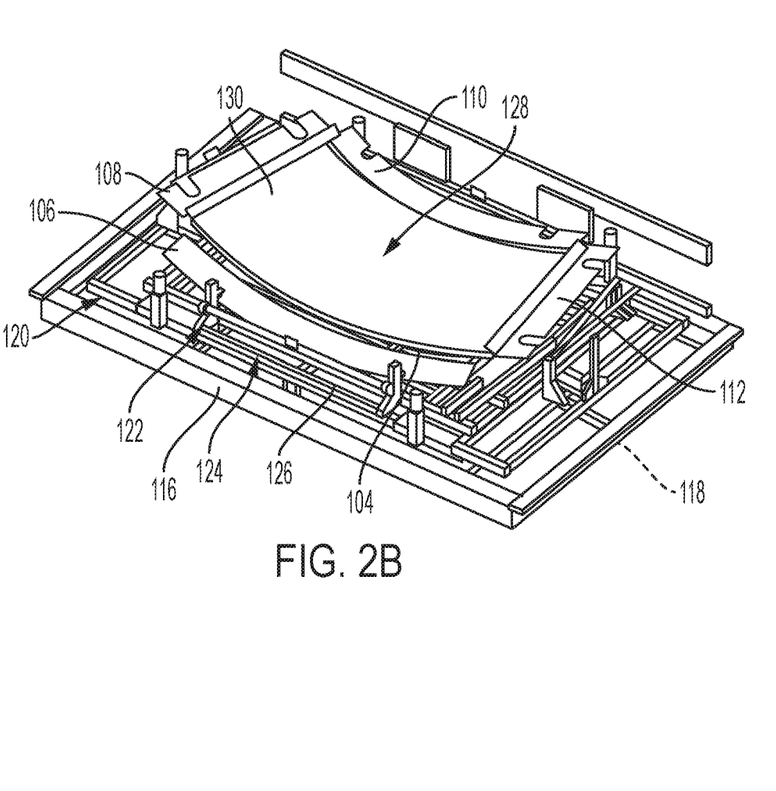
FIG. 2B is a perspective view of an assembly for bending a glass substrate having heat shields disposed in a second position, in accordance with various embodiments.
Figure 3A:
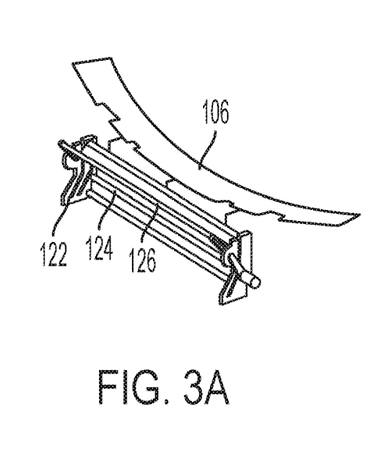
FIGS. 3A-3C are a series of perspective views showing one of the heat shields moving between the first position and the second position, in accordance with various embodiments.
Figure 3B:
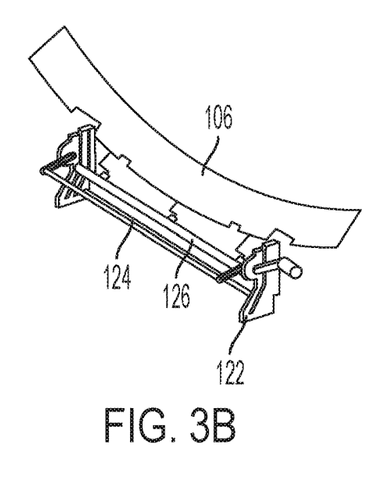
Figure 3C:
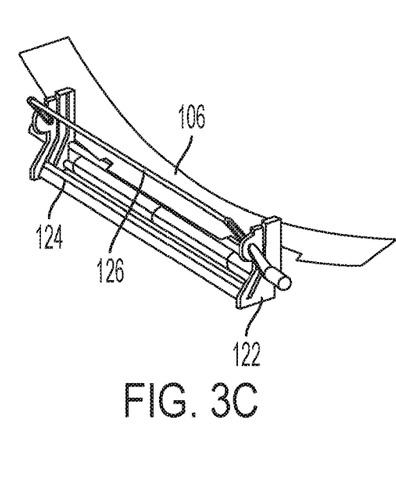

In various embodiments, it may be desirable to engage glass substrate 128 with a component such as press mold 114 to further control the shape of glass substrate 128. In this embodiment, press mold 114 may need to contact glass substrate 128, which may require heat shields 106, 108, 110, and 112 to be actuated to the second position, uncovering the first edge region. As shown in FIG. 1, press mold 114 includes actuator engagement member 134. As press mold 114 is lowered in the z-direction, member 134 contacts landing portion 126 of hinged member 124. This results in landing portion 126 moving and heat shields 106, 108, 110, and 112 moving to the second position where first edge region is no longer covered. FIG. 2B shows heat shields 106, 108, 110, and 112 in the second position. FIGS. 3A-3C show an actuation cycle of heat shield 106 (which is representative of heat shields 108, 110, and 112). In FIG. 3A, heat shield 106 is in the first position where a first edge portion of glass substrate would be covered. FIG. 3B shows heat shield 106 in mid-actuation where the first edge portion begins to be uncovered. FIG. 3C shows heat shield 106 in the second position, in which the first edge portion is uncovered and the heat shield is positioned either away from glass substrate 128 in the x- or y-direction or underneath glass substrate 128 in the z-direction. Once heat shields 106, 108, 110, or 112 are in the second position, they can remain in that position or they can return to the first position once member 134 disengages with landing portion 126.

In some embodiments, assembly 100 may not include press mold 114, and heat shields 106, 108, 110, and 112 can be actuated manually or through engagement with any other device configured to interact with landing portion 126. In some embodiments, actuation of heat shields 106, 108, 110, and 112 can be driven by a controller programed to drive actuation according to a predetermined schedule and according to a predetermined rate.

Actuating heat shields 106, 108, 110, and 112 to the second position can also be helpful to mitigate the bathtub effect in glass substrate 128. This is because during cooling of glass substrate 128 to room temperature, the first edge portion will cool at a slower rate than the remainder of glass substrate 128 as long as it is covered by heat shields 106, 108, 110, and 112. Therefore, the rate of cooling in the first edge region can be controlled to mitigate the bathtub effect in that region. In some embodiments, it can be possible to actuate heat shields 106, 108, 110, and 112 in a step-wise fashion such that a rate at which the first edge region cools is controlled. Furthermore, heat shields 106, 108, 110, and 112 can be used to help manage stresses in glass substrate 128, for example, by controlling the amount of heat delivered to the glass substrate 128 or the rate of cooling of glass substrate 128.

Any of the heat shields 106, 108, 110, 112, or any other heat shield described herein can be actuated simultaneously between the first and second positions. Alternatively, any heat shield can be independently actuated at a rate that differs from a rate of any other heat shield.

As described above, support structure 102 can be adopted to be mobile. Therefore, the bending procedure can be carried out by moving support structure 102 and therefore glass substrate 128 to a heating station (e.g., a furnace) where glass substrate 128 is heated. After glass substrate 128 is heated and bent to a substantial degree, support structure 102 can be moved or indexed to a cooling station or pressing station. The cooling station can be a location outside of the heating station where glass substrate 128 can cool to room temperature. The pressing station may be a location where press mold 114 is able to interact with glass substrate 128 as described herein. In some embodiments, the cooling station and the pressing station may be combined into one station.

Figure 4:
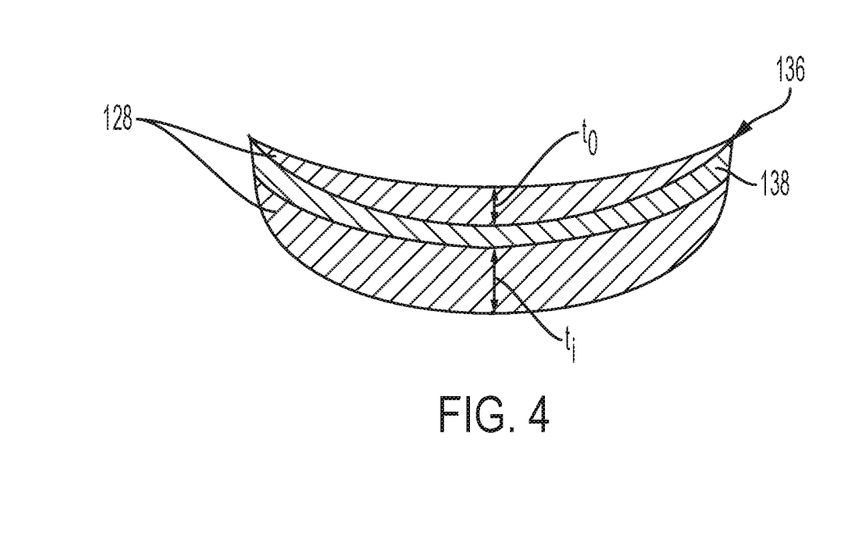
FIG. 4 is a sectional view of a glass assembly including glass substrates formed using the assembly for bending the glass substrate, in accordance with various embodiments.

Glass substrate 128 formed by the methods described herein can be used to make a glass laminate. FIG. 4 is a sectional view of glass laminate 136. Glass laminate 136 includes two curved glass substrates 128 with interlayer 138 disposed therebetween. The interlayer can include any suitable material such as polyvinyl butyral, acoustic polyvinyl butyral, an ionomer, ethylene-vinyl acetate, a thermoplastic polyurethane, a polyester, polyethylene terephthalate, or a mixture thereof. As a result of the methods, described herein, by which glass substrates 128 are formed, glass laminate 136 can be formed to precise specifications to avoid distortions or defects such as the bathtub effect in glass laminate 136. Although shown as including two glass substrates 128, in further embodiments laminate 136 can include any further plural number of glass substrates 128.

According to embodiments of the present disclosure, the glass laminate 136 can include a first of the two curved glass substrates 128 having a thickness ($t_o$) and a second of the two curved glass substrates 128 having a thickness ($t_i$) such that $t_o/t_i$ is in a range from 1 to 20, or from 3 to 20, or from 3 to 15, or from 4 to 10, and like ratios, including intermediate values and ranges.

Glass laminate 136, or a single glass substrate 128, can be included in a vehicle such as an automobile, watercraft, or aerospace vehicle. Generally, the vehicle will have a body defining an interior and an opening in communication with the interior. Glass laminate 136 can be disposed in the opening.

Additional Embodiments

The following exemplary embodiments are provided, the numbering of which is not to be construed as designating levels of importance:

Embodiment 1 provides a method for bending a glass substrate, the method comprising:
actuating at least one heat shield to a first position at least partially covering an edge portion of a first major surface of the glass substrate;
heating the glass substrate; and
actuating the at least one heat shield to a second position at least partially uncovering the edge portion of the glass substrate.

Embodiment 2 provides the method of Embodiment 1, wherein the at least one heat shield comprises a thermally absorbent material, a thermally reflective material, or a combination thereof.

Embodiment 3 provides the method of Embodiment 2, wherein the thermally absorbent material comprises a metal, a ceramic, a fiber, or a mixture thereof.

Embodiment 4 provides the method of any one of Embodiments 2 or 3, wherein the thermally absorbent material comprises stainless steel, a nickel alloy, or a combination thereof.

Embodiment 5 provides the method of any one of Embodiments 1-4, wherein the glass substrate further comprises a second major surface opposing the first major surface.

Embodiment 6 provides the method of any one of Embodiments 1-5, wherein the first major surface comprises a first edge portion located along an outer perimeter of the first major surface.

Embodiment 7 provides the method of Embodiment 6, wherein the first edge portion extends from the outer perimeter towards a center of the first major portion.

Embodiment 8 provides the method of any one of Embodiments 6 or 7, wherein the first edge portion is in a range of from about 1 percent surface area to about 40 percent surface area of the first major surface.

Embodiment 9 provides the method of any one of Embodiments 6-8, wherein the first edge portion is in a range of from about 5 percent surface area to about 20 percent surface area of the first major surface.

Embodiment 10 provides the method of any one of Embodiments 5-9, wherein the second major surface comprises a second edge portion located along an outer perimeter of the second major surface Embodiment 11 provides the method of Embodiment 10, wherein the second edge portion extends from the outer perimeter towards a center of the second major surface.

Embodiment 12 provides the method of any one of Embodiments 10-11, wherein the second edge portion is in a range of from about 1 percent surface area to about 40 percent surface area of the second major surface.

Embodiment 13 provides the method of any one of Embodiments 10-12, wherein the second edge portion is in a range of from about 5 percent surface area to about 20 percent surface area of the second major surface.

Embodiment 14 provides the method of any one of Embodiments 1-13, wherein the glass substrate comprises soda lime silicate glass, alkali aluminosilicate glass, alkali containing borosilicate glass, alkali aluminophosphosilicate glass, alkali aluminoborosilicate glass, or a mixture thereof.

Embodiment 15 provides the method of Embodiment 14, wherein the soda lime silicate glass is substantially free of iron, iron oxide, or mixtures thereof.

Embodiment 16 provides the method of any one of Embodiments 1-15, wherein a thickness of the glass substrate is in a range of from about 0.5 mm to about 5 mm.

Embodiment 17 provides the method of any one of Embodiments 1-16, wherein a thickness of the glass substrate is in a range of from about 1 mm to about 2 mm.

Embodiment 18 provides the method of any one of Embodiments 1-17, wherein the at least one heat shield fully covers the edge portion of the first major surface.

Embodiment 19 provides the method of any one of Embodiments 1-18, wherein the at least one heat shield is a first heat shield and the method further comprises actuating a second heat shield, a third heat shield, a fourth heat shield, or a combination thereof to the first position at least partially covering the edge portion of the first major surface of the glass substrate.

Embodiment 20 provides the method of any one of Embodiments 5-19, further comprising:
actuating a fifth heat shield to a first position at least partially covering an edge portion of a second major surface of the glass substrate;
heating the glass substrate; and
actuating the fifth heat shield to a second position at least partially uncovering the edge portion of the glass substrate.

Embodiment 21 provides the method of Embodiment 20, further comprising actuating a sixth heat shield, a seventh heat shield, an eighth heat shield, or a combination thereof to the first position at least partially covering the edge portion of the second major surface of the glass substrate.

Embodiment 22 provides the method of Embodiment 21, wherein the first heat shield, second heat shield, third heat shield, fourth heat shield, fifth heat shield, sixth shield, seventh heat shield, eighth heat shield, or a combination thereof are actuated to the first position substantially simultaneously.

Embodiment 23 provides the method of any one of Embodiments 21 or 22, further comprising actuating the second heat shield, third heat shield, fourth heat shield, fifth heat shield, sixth shield, seventh heat shield, eighth heat shield, or a combination thereof to the second position at least partially uncovering the edge portion of the first major surface and the second major surface of the glass substrate.

Embodiment 24 provides the method of Embodiment 23, wherein the first heat shield, second heat shield, third heat shield, fourth heat shield, fifth heat shield, sixth shield, seventh heat shield, eighth heat shield, or a combination thereof are actuated to the second position substantially simultaneously.

Embodiment 25 provides the method of any one of Embodiments 1-24, further comprising contacting the glass substrate with a bending ring.

Embodiment 26 provides the method of any one of Embodiments 1-25, wherein heating the glass substrate comprises heating the glass substrate to a temperature in a range of from about 600° C. to about 800° C.

Embodiment 27 provides the method of any one of Embodiments 1-26, wherein heating the glass substrate comprises heating the glass substrate to a temperature in a range of from about 700° C. to about 750° C.

Embodiment 28 provides the method of any one of Embodiments 1-27, further comprising heating the edge portion to a lower temperature than a center portion of the glass substrate when the at least one heat shield is in the first position.

Embodiment 29 provides the method of any one of Embodiments 1-28, further comprising heating the edge portion to a temperature that is in a range of from about 5° C. to about 100° C. lower than a center portion of the glass substrate when the at least one heat shield is in the first position.

Embodiment 30 provides the method of any one of Embodiments 1-29, further comprising heating the edge portion to a temperature that is in a range of from about 30° C. to about 60° C. lower than a center portion of the glass substrate when the at least one heat shield is in the first position.

Embodiment 31 provides the method of any one of Embodiments 1-30, further comprising cooling the glass substrate to room temperature.

Embodiment 32 provides the method of Embodiment 31, wherein the at least one heat shield is actuated to the second position during cooling.

Embodiment 33 provides the method of any one of Embodiments 1-32, further comprising pressing the glass substrate.

Embodiment 34 provides the method of Embodiment 33, wherein the glass substrate is pressed when the at least one heat shield is in the second position.

Embodiment 35 provides the method of any one of Embodiments 1-34, wherein the glass substrate is pressed with a press mold.

Embodiment 36 provides the method of Embodiment 35, wherein the press mold engages an actuator to actuate the at least one heat shield between the first position and the second position.

Embodiment 37 provides the method of any one of Embodiments 1-36, wherein the at least one heat shield comprises a curved profile.

Embodiment 38 provides the method of any one of Embodiments 1-37, wherein the at least one heat shield comprises one or more perforations extending at least partially therethrough.

Embodiment 39 provides the method of Embodiment 38, wherein the one or more perforations individually have a diameter in a range from about 2 mm to about 10 mm.

Embodiment 40 provides the method of any one of Embodiments 38-39, wherein the one or more perforations individually have a diameter in a range of from about 4 mm to about 6 mm.

Embodiment 41 provides the method of any one of Embodiments 38-40, wherein the one or more perforations individually account for about 5 vol % to about 95 vol % of the at least one heat shield.

Embodiment 42 provides the method of any one of Embodiments 38-41, wherein the one or more perforations individually account for about 10 vol % to about 70 vol % of the at least one heat shield.

Embodiment 43 provides the method of any one of Embodiments 1-42, wherein the at least one heat shield further comprises a ceramic cloth disposed over at least a portion of the at least one heat shield.

Embodiment 44 provides the method of any one of Embodiments 1-43, wherein the at least one heat shield further comprises a coating disposed over at least a portion of the at least one heat shield.

Embodiment 45 provides the method of Embodiment 44, wherein the coating comprises a metallic coating, a paint, or a combination thereof.

Embodiment 46 provides the method of Embodiment 45, wherein the metallic coating comprises an elemental metal, a metal alloy, or a combination thereof.

Embodiment 47 provides the method of Embodiment 46, wherein the elemental metal comprises gold.

Embodiment 48 provides the method of any one of Embodiments 46 or 47, wherein the metal alloy comprises a metal oxide, a chromium, or a combination thereof.

Embodiment 49 provides a method of bending a glass substrate, the method comprising:
  contacting a glass substrate with a bending ring;
  actuating a first heat shield, a second heat shield, a third heat shield, and a fourth heat shield to a first position at least partially covering an edge portion of a first major surface of the glass substrate;
  heating the glass substrate;
  actuating at least one of the heat shields to a second position at least partially uncovering the edge portion of the glass substrate;
  engaging the glass substrate with press mold; and
  cooling the glass substrate.

Embodiment 50 provides a curved glass substrate formed according to the method of any one of Embodiments 1-49.

Embodiment 51 provides a glass laminate structure comprising:
  a first curved glass substrate of Embodiment 50;
  a second curved glass substrate of Embodiment 50; and
  an interlayer disposed between the first curved glass substrate and the second curved glass substrate.

Embodiment 52 provides the glass laminate structure of Embodiment 51, wherein the interlayer comprises polyvinyl butyral, acoustic polyvinyl butyral, an ionomer, ethylene-vinyl acetate, a thermoplastic polyurethane, a polyester, polyethylene terephthalate, or a mixture thereof.

Embodiment 53 provides an assembly for bending a glass substrate, the assembly comprising:
  a support extending along an x-direction and a y-direction and comprising a support first major surface and opposed second major surface;
  a bending ring attached to and extending vertically along a z-direction from the support first major surface substantially along an outer perimeter of the support first major surface; and
  an actuatable heat shield attached to the support.

Embodiment 54 provides the assembly of Embodiment 53, further comprising an active heater element in thermal communication with the bending ring.

Embodiment 55 provides the assembly of any one of Embodiments 53 or 54, wherein the at least one heat shield comprises a thermally absorbent material.

Embodiment 56 provides the assembly of any one of Embodiments 53-55, wherein the thermally absorbent material comprises a metal, a ceramic, or a mixture thereof.

Embodiment 57 provides the assembly of any one of Embodiments 55 or 56, wherein the thermally absorbent material comprises stainless steel.

Embodiment 58 provides the assembly of any one of Embodiments 53-57, wherein the at least one heat shield is a first heat shield and the assembly further comprises actuating a second heat shield, a third heat shield, a fourth heat shield, or a combination thereof attached to the support structure.

Embodiment 59 provides the assembly of any one of Embodiments 53-58, further comprising a sixth heat shield, a seventh heat shield, an eighth heat shield, or a combination thereof attached to the support structure.

Embodiment 60 provides the assembly of any one of Embodiments 53-59, wherein the assembly is adapted to be moved from a heating station to a cooling station.

Embodiment 61 provides the assembly of any one of Embodiments 53-60, wherein the at least one heat shield comprises one or more perforations extending at least partially therethrough.

Embodiment 62 provides the assembly of Embodiment 61, wherein the one or more perforations individually have a diameter in a range of from about 2 mm to about 10 mm.

Embodiment 63 provides the assembly of any one of Embodiments 61 or 62, wherein the one or more perforations individually have a diameter in a range of from about 4 mm to about 6 mm.

Embodiment 64 provides the assembly of any one of Embodiments 61-63, wherein the one or more perforations individually account for about 5 vol % to about 95 vol % of the at least one heat shield.

Embodiment 65 provides the assembly of any one of Embodiments 61-64, wherein the one or more perforations individually account for about 10 vol % to about 70 vol % of the at least one the heat shield.

Embodiment 66 provides the assembly of any one of Embodiments 61-65, wherein the at least one heat shield further comprises a ceramic cloth disposed over at least a portion of the at least one heat shield.

Embodiment 67 provides the assembly of any one of Embodiments 53-66, wherein the thermally absorbent material comprises stainless steel, a nickel alloy, or a combination thereof.

Embodiment 68 provides the assembly of any one of Embodiments 53-67, wherein the at least one heat shield further comprises a coating disposed over at least a portion of the at least one heat shield.

Embodiment 69 provides the assembly of Embodiment 68, wherein the coating comprises a metallic coating, a paint, or a combination thereof.

Embodiment 70 provides the assembly of Embodiment 69, wherein the metallic coating comprises an elemental metal, a metal alloy, or a combination thereof.

Embodiment 71 provides the assembly of Embodiment 70, wherein the elemental metal comprises gold.

Embodiment 72 provides the assembly of any one of Embodiments 70 or 71, wherein the metal alloy comprises a metal oxide, a chromium, or a combination thereof.

Embodiment 73 provides a vehicle comprising:
a body defining an interior and an opening in communication with the interior; and the glass laminate of any one of Embodiments 51-72, disposed in the opening.

What is claimed is:

1. A method for bending a glass substrate, the method comprising:
   actuating at least one heat shield to a first position at least partially covering an edge portion of a first major surface of the glass substrate, wherein the at least one heat shield comprises a hinged member;
   heating the glass substrate; and
   actuating the heat shield to a second position at least partially uncovering the edge portion of the glass substrate, wherein the actuating the heat shield comprises lowering a press mold towards the glass substrate and contacting the hinged member with an actuator engagement member of the press mold as the press mold is lowered to cause movement of the heat shield via the hinged member so as to permit contact between the press mold and the glass substrate.

2. The method of claim 1, wherein the at least one heat shield comprises a thermally absorbent material, a thermally reflective material, or a combination thereof.

3. The method of claim 2, wherein the thermally absorbent material comprises a metal, a ceramic, a fiber, or a mixture thereof.

4. The method of claim 1, wherein the heat shield comprises one or more perforations extending at least partially therethrough.

5. The method of claim 1, wherein the glass substrate comprises soda lime silicate glass, alkali aluminosilicate glass, alkali containing borosilicate glass, alkali aluminophosphosilicate glass, alkali aluminoborosilicate glass, or a mixture thereof.

6. The method of claim 1, wherein a thickness of the glass substrate is in a range of from about 0.5 mm to about 5 mm.

7. The method of claim 1, wherein heating the glass substrate comprises heating the glass substrate to a temperature in a range of from about 600° C. to about 800° C.

8. The method of claim 1, wherein heating the glass substrate comprises heating the edge portion to a temperature that is in a range of from about 5° C. to about 100° C. lower than a center portion of the glass substrate when the at least one heat shield is in the first position.

9. The method of claim 1, wherein the at least one heat shield comprises a curved profile.

10. A method of bending a glass substrate, the method comprising:
    contacting a glass substrate with a bending ring;
    actuating a plurality of heat shields to a first position at least partially covering an edge portion of a first major surface of the glass substrate, wherein each of the plurality of heat shields comprises a hinged member;
    heating the glass substrate;
    actuating the plurality of heat shields to a second position at least partially uncovering the edge portion of the glass substrate;
    engaging the glass substrate with a press mold; and
    cooling the glass substrate, wherein actuating the plurality of heat shields to the second position comprises lowering the press mold towards the glass substrate and contacting one or more of the hinged members with an actuator engagement member of the press mold as the press mold is lowered to cause movement of the plurality of heat shields so as to permit contact between the press mold and the glass substrate.

11. The method of claim 10, wherein at least one the plurality of heat shields comprises one or more perforations extending at least partially therethrough.

\* \* \* \* \*

UNITED STATES PATENT AND TRADEMARK OFFICE
CERTIFICATE OF CORRECTION

| | |
|---|---|
| PATENT NO. | : 11,702,356 B2 |
| APPLICATION NO. | : 16/849268 |
| DATED | : July 18, 2023 |
| INVENTOR(S) | : Michael Timothy Brennan et al. |

Page 1 of 1

It is certified that error appears in the above-identified patent and that said Letters Patent is hereby corrected as shown below:

In the Claims

In Column 15, Line 1, in Claim 11, delete "one the" and insert -- one of the --.

Signed and Sealed this
Nineteenth Day of December, 2023

Katherine Kelly Vidal
*Director of the United States Patent and Trademark Office*